Aug. 12, 1941.   J. W. PRATT ET AL   2,252,030
APPARATUS FOR ACTIVATING THERMOPLASTIC CEMENT
Filed Nov. 21, 1938   4 Sheets-Sheet 1

INVENTORS
John W. Pratt
Hubert Boothroyd
By their attorney
Victor Cobb

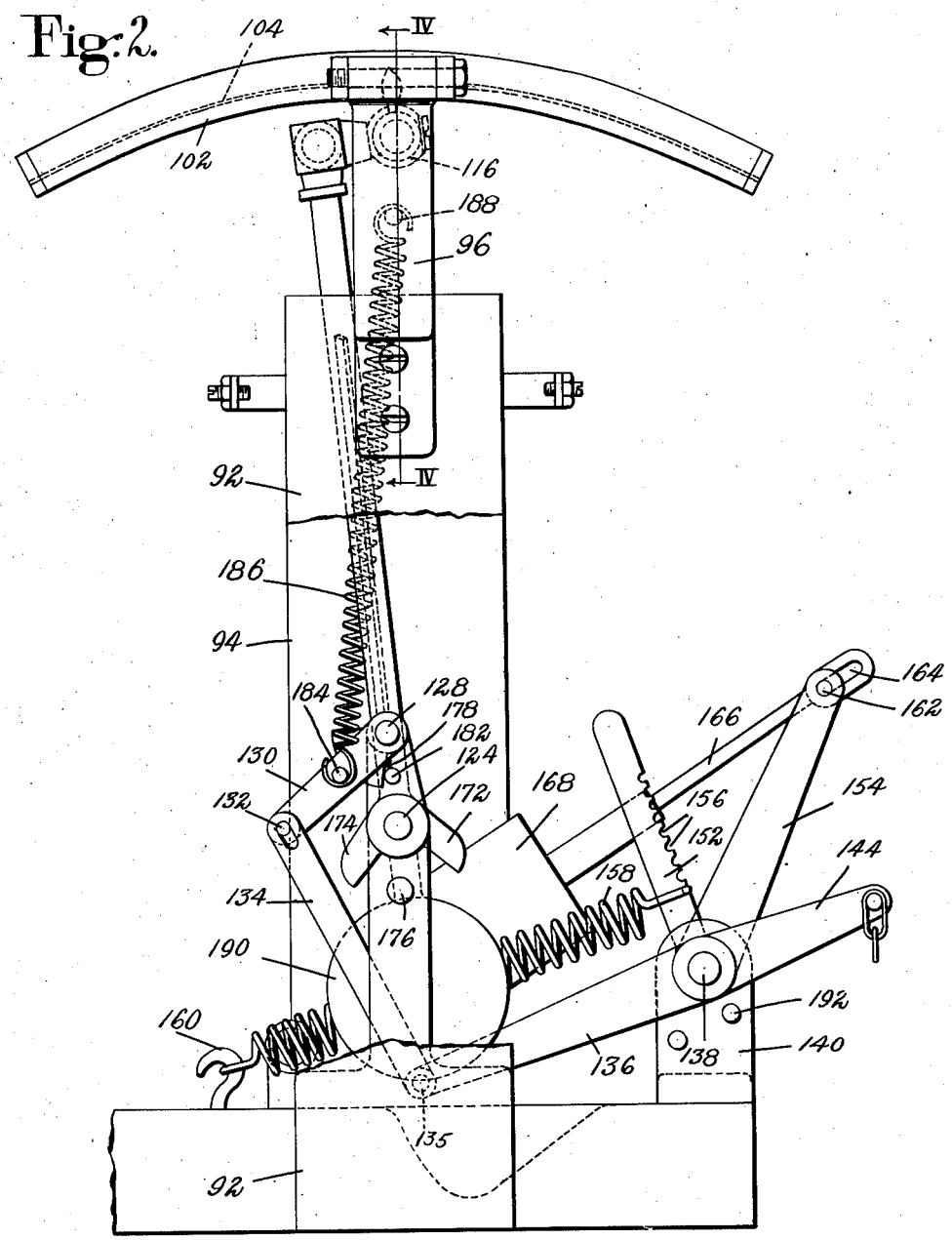

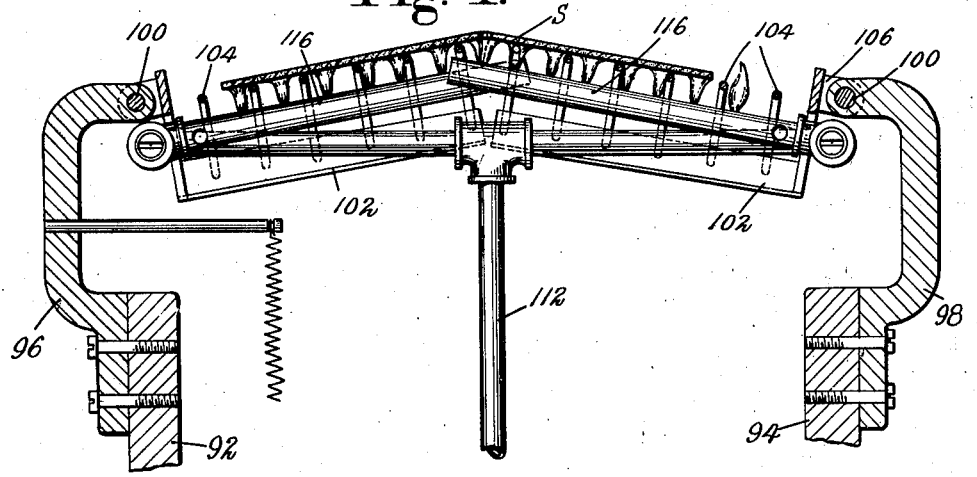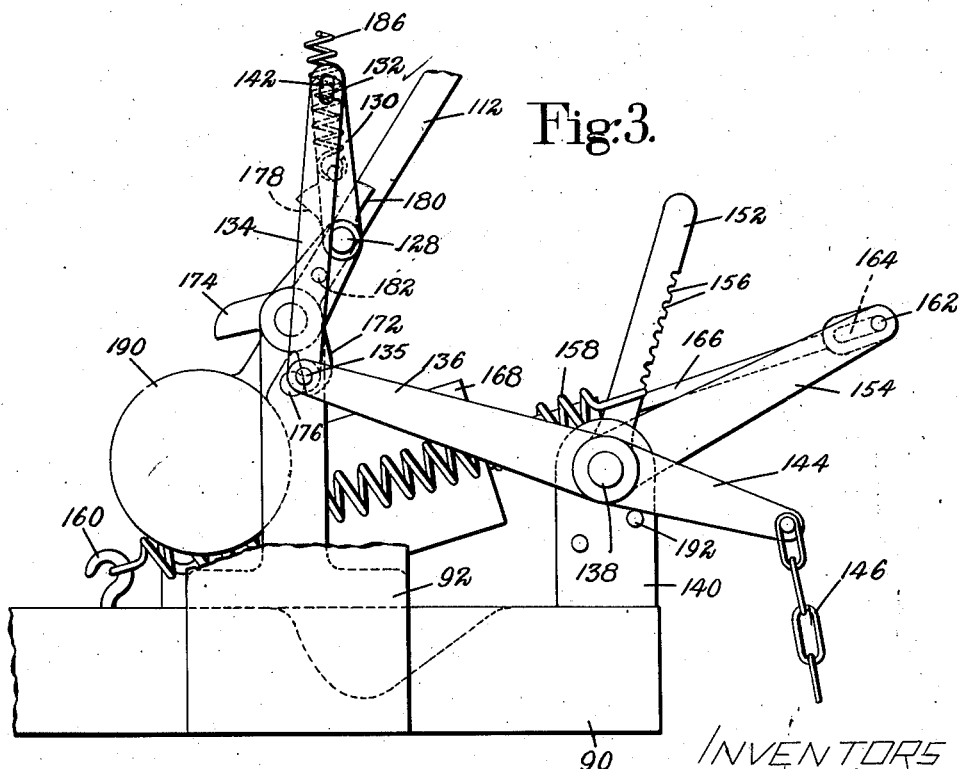

Aug. 12, 1941. J. W. PRATT ET AL 2,252,030
APPARATUS FOR ACTIVATING THERMOPLASTIC CEMENT
Filed Nov. 21, 1938   4 Sheets-Sheet 4
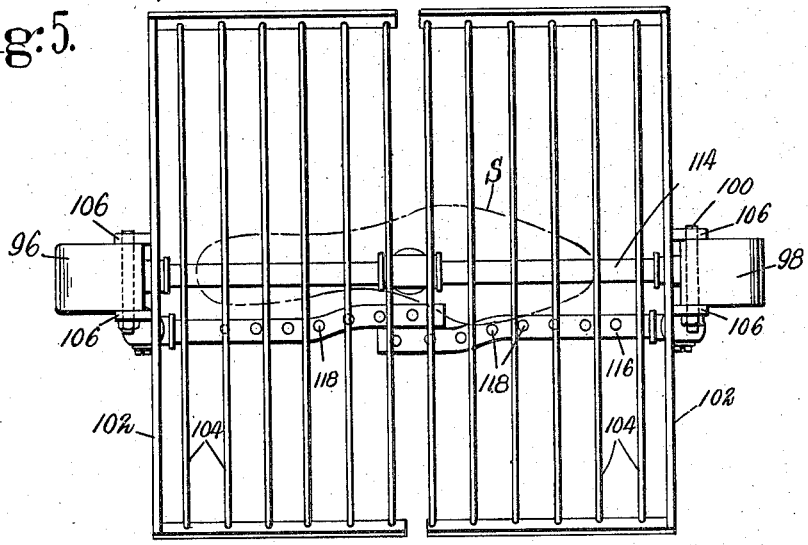
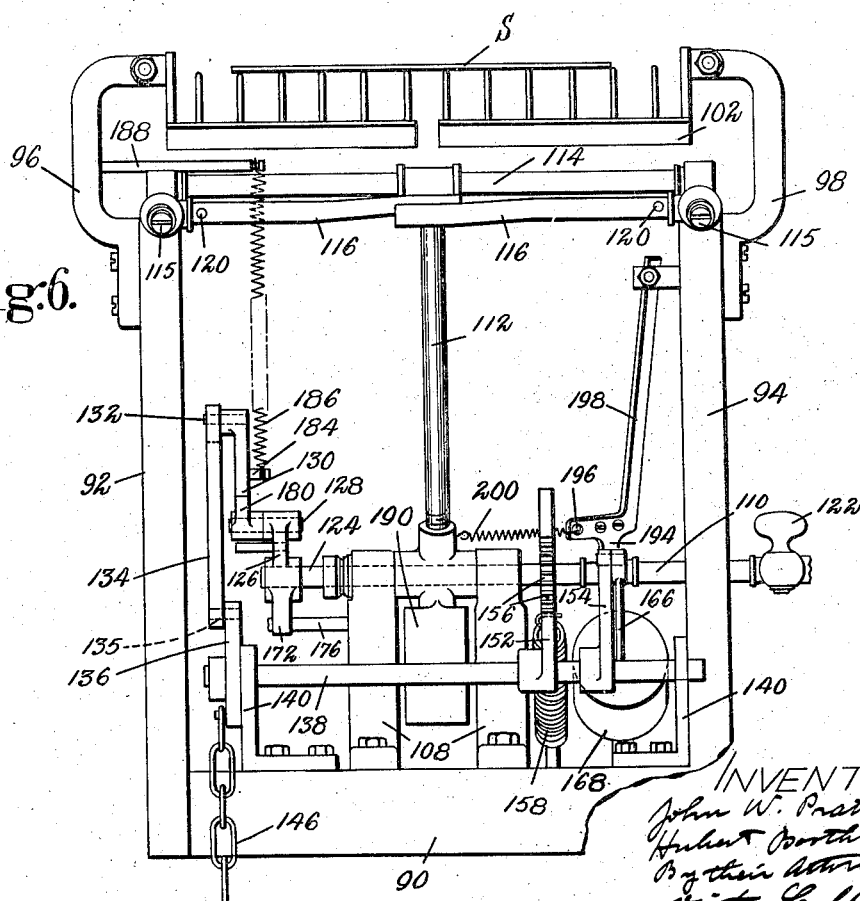

Patented Aug. 12, 1941

2,252,030

UNITED STATES PATENT OFFICE 2,252,030

APPARATUS FOR ACTIVATING THERMOPLASTIC CEMENT

John William Pratt and Hubert Boothroyd, Leicester, England, assignor to United Shoe Machinery Corporation, Borough of Flemington, N. J., a corporation of New Jersey Application November 21, 1938, Serial No. 241,622
In Great Britain December 7, 1937

20 Claims. (Cl. 263—9)

This invention relates to improvements in apparatus for activating adhesive for securing shoe parts together. The apparatus is herein shown by way of example as adapted for the heat-activation of thermoplastic cement upon shoe soles prior to their being pressed upon the shoes to effect attachment thereto.

In the operation of sole laying as usually practised, a rubber cement is applied to the shoe and sole or, in some cases, to the sole only and, after the cement has reached a suitable tacky condition, the sole is located upon the shoe and placed in the sole laying machine. It has also been proposed to use a thermoplastic cement applied to the sole and the shoe bottom or to the sole only, the cement on the sole being activated by heat and the shoe and sole pressed together in a sole laying machine.

Objects of this invention are to provide an improved apparatus for activating thermoplastic cement whereby quick setting or cooling of the cement is facilitated and to provide convenient and effective apparatus for this purpose.

The novel apparatus for heat-activating the thermoplastic on the part to be united, for example upon the sole, consists in means for subjecting the adhesive coating to intense heat for a short period, as for example by bringing flame into contact with the cement, so that while, on the one hand, the coating is adequately activated, yet, on the other hand, the coated part is not bodily raised in temperature to any substantial degree. Under these conditions, of course, the activated coating will cool much more rapidly than it would if the part to which it was applied were heated bodily to a substantial degree.

The apparatus further comprises, as illustrated herein, means, for example a grid, to support the article to which cement has been applied with its cemented face lowermost, that is, against the grid, a heating device beneath and at one side of the grid, and means for moving the grid and heating device relatively to cause the heating device to traverse the cemented surface at a predetermined rate, whereby the cement coating is activated without substantially raising the temperature of the body to which the cement has been applied. As illustrated, a series of gas burners are made to pass beneath a stationary grid, with the flames of the burners in contact with the cement, by means of a pull the action of which is delayed to cause slow passage of the burners beneath the grid. The grid and burners are adjustable to adapt them to conform to the shape of a molded or conformed sole. Preferably the apparatus is so arranged that upon depression of a treadle the burner moves slowly beneath the grid in one direction and upon a second depression of the treadle the burner moves beneath the grid at the same rate in the opposite direction. When no heat is being utilized the burners are automatically turned down.

These and other features of the invention will appear more fully from the following detailed description when read in connection with the accompanying drawings and will be pointed out in the appended claims.

In the drawings,

Fig. 2 is a similar view showing the parts in the positions they assume during the traverse of the heating device beneath the grid from right to left;

Fig. 3 is a detail in elevation of the mechanism for operating the heating device with the parts in the positions they assume after the treadle is depressed and before it is released;

Fig. 4 is a transverse section through the grid and heating device;

Fig. 5 is a plan view of the grid; and

Fig. 6 is a front elevation of the apparatus.

Figure 1:
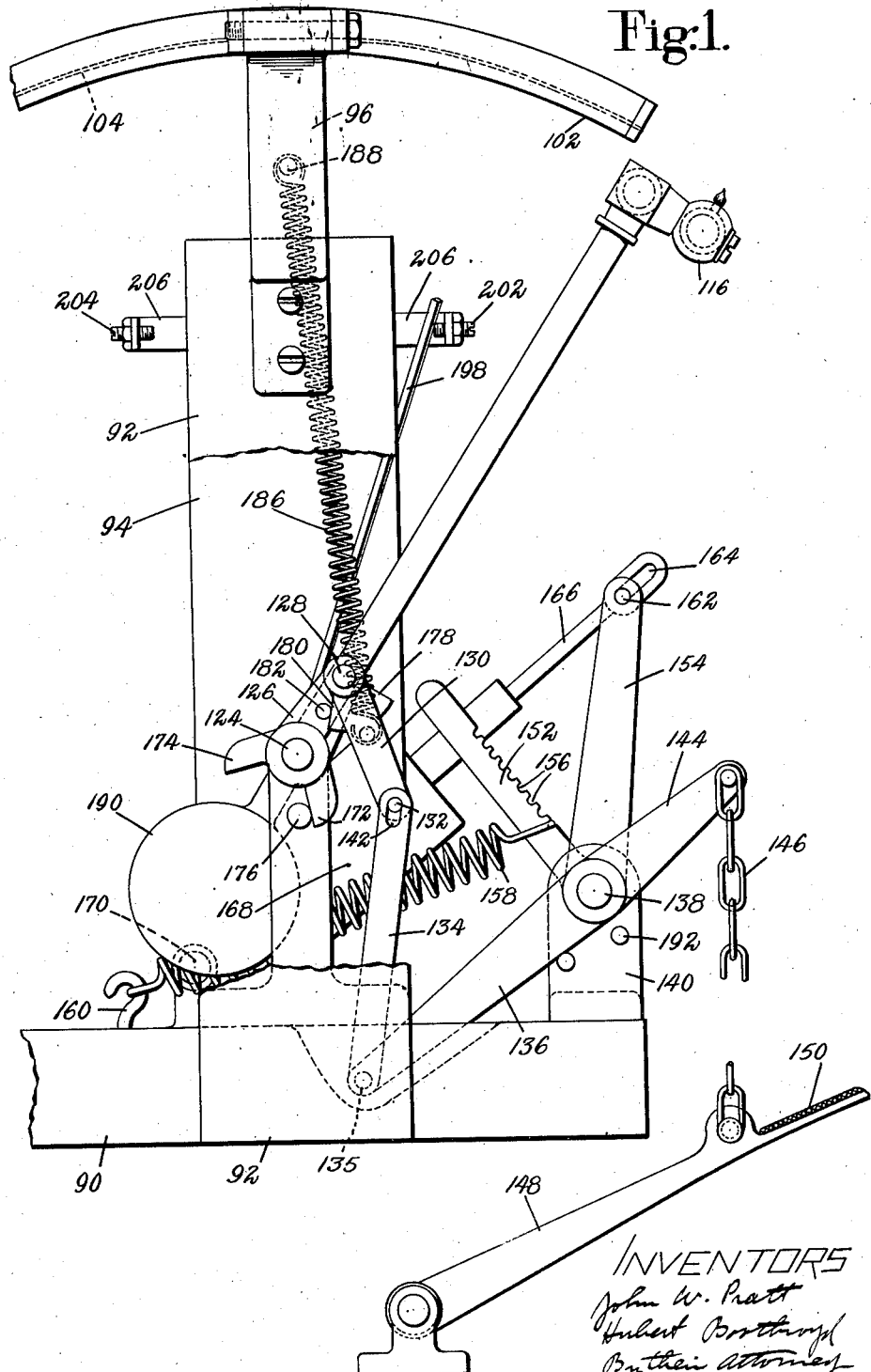
Fig. 1 is an elevation of the left-hand side of the apparatus for heat activation of cement on the sole showing the parts in their initial positions.

A thermoplastic adhesive which has been found satisfactory for use in one-way sole laying, that is, where the cement is applied to the sole only, has the following formula, the proportions being taken by weight:

| | |
|---|---|
| Water white rosin | 48 |
| Gutta-percha | 17¾ |
| Latex (40% rubber content) | 8 |
| China-wood oil (polymerized) | 6½ |
| Beta naphthol | ⅓ |

The composition is conveniently prepared by heating together in a suitable vessel the latex and part of the rosin (which is preferably powdered). On heating carefully to about 330° F., the water content of the latex will be driven off and the rubber and rosin will be intimately associated or digested. The remainder of the rosin may be added to the molten mass and then portions of the China-wood oil and gutta percha. Preferably the composition is allowed to cool between the additions and is reheated prior to each addition. The beta naphthol may be added at the last stage. This composition contains a relatively large proportion of the China-wood oil which has the effect of lowering the temperature at which the composition becomes tacky and enables the applied coating to be activated more readily without apparently affecting substantially the strength of the bond ultimately formed. The incorporation of the rubber from the latex is effective to destroy to a greater degree than does the gutta-percha alone any brittleness of the rosin and improves the adhesive qualities of the composition. The beta naphthol serves as a preservative.

The illustrated heat-activating apparatus will now be described, referring first to Figs. 1, 4 and 5. The apparatus comprises a base 90 from which two uprights 92, 94 extend. To the upper end portions of the uprights 92, 94 are secured two brackets 96, 98, one on each side, each bracket having at its upper end a horizontal pivot 100 to each of which one-half of the grid is pivoted. Each half of the grid comprises a U-shaped frame 102 between the legs of which parallel wires 104 extend, each grid frame 102 being provided with a pair of ears 106 for the pivot 100. The pivots 100 extend from front to rear of the apparatus and each is adapted frictionally to retain in place the half of the grid pivoted to it. When the two halves of the grid are horizontal (Fig. 5) they form together a substantially continuous grid and, if desired, the adjacent ends of the two halves of the grid may be lifted more or less, as shown in Fig. 4, to adapt the grid for supporting a molded or conformed sole S, each of the two halves of the grid being movable about its pivot 100 by applying sufficient force thereto. Each grid, as shown in Fig. 1, has an upward convexity from front to rear, the center of curvature of the grid being located substantially at the axis about which the heating device (to be described) moves.

Fixed to the base 90 between the uprights 92 and 94 (Fig. 6) are two brackets 108 having bearings in which is journaled a horizontal tube 110 the right-hand portion of which extends through an aperture in the upright 94. Extending upwardly from the tube 110 between the brackets 108 is a second tube 112 which joins at its upper end a third tube 114 which is horizontal. To each end portion of the tube 114 is pivoted at 115 a piece of pipe 116 plugged at its inner end, having a series of perforations 118 on its upper side and provided with an air inlet 120 near its outer end. Each pipe 116, therefore, constitutes a series of Bunsen burners the flames of which will be directed toward the grid. The perforations 118 are close enough together so that a substantially continuous linear flame is formed. Gas is furnished to the burners 116 by connecting the tube 110 to a source of supply, the gas being controlled by a cock 122. The burners 116 extend underneath the grid 104 in a direction from right to left and may be swung about the axis of the tube 110 to cause the contiguous Bunsen flames under the grid to traverse the grid from one side thereof to the other to activate the coating on the sole S positioned on the grid with its cement face down and its longitudinal axis extending in a direction from right to left. Each of the burners 116 may be adjusted about its pivot 115 to cause it to lie substantially parallel to the half of the grid which overlies it. Preferably the burners 116 overlap each other to some extent at their inner ends so that when they are adjusted as shown in Fig. 4 there will be no space between the ends of the burners and therefore the contiguity of the burners and flames will not be broken.

The following mechanism is provided for effecting the movement of the burners 116 under the grids 102 and for automatically controlling the rate of traverse of the burners: The left-hand end of the tube 110 has an extension 124 fixed thereto to which is fastened an arm 126. To the end of the arm 126 there is pivoted at 128 a link 130 the other end of which is pivoted at 132 to the upper end of a second link 134 which, in turn, is pivoted at 135 to the rear arm 136 of an operating lever fixed to a rockshaft 138 journaled in brackets 140 secured to the base 90. The upper end of the link 134 has a short slot 142 to receive the pivot pin 132 in the arm 130. The operating lever has a forward arm 144 which is connected by a chain 146 to a treadle lever 148 operated by a treadle 150 (Fig. 1). Fixed to the rockshaft 138 and upwardly extending therefrom are two arms 152, 154. The arm 152 has a plurality of notches 156 in its forward edge and the front end of a spring 158 is hooked in one or another of the notches 156, the rear end of the spring being anchored to a hook 160 on the base 90.

The arm 154 carries a pin 162 which engages a slot 164 in the forward end of a rod 166 connected to the piston of a dash-pot the cylinder 168 of which is pivoted at 170 to the base 90, the arrangement being such that the forward movement of the rod 166 with respect to the cylinder 168 is not resisted but rearward movement of the rod 166 is made to take place slowly at a predetermined slow rate which is dependent upon the adjustment of the spring 158 along the arm 152.

The arm 126 which is fixed to the extension 124 of the tube 110 has two lugs 172, 174 which cooperate with a pin 176 on the left-hand bearing bracket 108 so that when the lug 172 is in engagement with the pin 176 the burners 116 are at the limit of their forward movement and are beyond the forward end of the grid 102. When the burners are swung rearwardly about the center of the extension 124 until the lug 174 engages the pin 176, the burners 116 will be beyond the rear end of the grid. That is, the burners in either of their limited positions will be beyond the grid and there will be no heating of the grids when the machine is standing idle with the burners lit.

The arm 130 has two stop surfaces 178, 180 which cooperate with a pin 182 on the arm 126 to limit in both directions rotation of the arm 130 about its pivot 128. Midway of the arm 130 is a pin 184 to which one end of a long tension spring 186 is connected, the other end of the spring being attached to a pin 188 fixed to the bracket 86. The weight of the burners is preferably counterbalanced by a weight 190 connected to the pipe 110 on the side opposite the burners.

The operation of the above-described mechanism is as follows: When, with the parts in the positions shown in Fig. 1, the treadle 150 is depressed, the operating lever 136, 144 and the arms 152, 154 are all turned clockwise with the rockshaft 138. This movement tensions the spring 158 and withdraws the piston rod 166 of the dash-pot 168. The link 134 also moves upwardly, turning the arm 130 about its center 128. The parts assume finally the position shown in Fig. 3, movement of the lever arm 144 having been stopped by engagement with a pin 192 in the bracket 140. Of course the upward push of the link 134 can move the arm 130 only to a position in which the pivots 135, 128 and 132 are in a straight line. When they approach that position, however, the spring 186 acts to throw the arm 130 sufficiently toward the left, as shown in Fig. 3, so that the pivots 135 and 132 are out of line with the pivot 128, the parts being able to assume this position by reason of the pin-and-slot connection 132, 142, whereupon the treadle is released. The downward pull of the link 134, due to the reaction of the spring 158, will turn the arm 130 about its pivot 128 until the surface 178 engages a pin 182, this position of the arm being shown in Fig. 2. The arm 130 can assume the position shown in Fig. 2 before control of the movement is assumed by the dash-pot because it occurs before the pin 162 reaches the end of the slot 164 and begins to push upon the piston rod 166 of the dash-pot. In Fig. 2 the parts are illustrated in the positions they assume during movement of the burners from right to left, the spring 158 acting to turn the lever 136 counter-clockwise and, by the pull of the link 134 on the arm 130, turn the burners slowly about the axis 124 until the lug 174 engages the pin 176, in which position the burners 116 will be beyond the rear end of the grid 102 and will come to rest in that position. During the passage of the burners under the sole, each portion of the cemented area thereof is subjected to intense heat for a short time, by direct contact of the flames with the cement as illustrated in Fig. 4, which time will be the same for a given setting of the machine, and the entire cemented area is activated without subjecting any portion of the body of the sole to the action of the flames long enough to raise substantially the temperature of the sole as a whole, there being thus no substantial storage of heat in the sole to retard the setting of the cement after the sole is applied to the shoe bottom. When the treadle is again depressed the spring 158 is again placed under tension and the piston rod 166 of the dash-pot withdrawn while at the same time the movement of the lever arm 136, through the link 134, turns the arm 130 clockwise until the pivots 135, 128 and 132 are again in a straight line, whereupon the spring 186 will throw the arm 130 farther clockwise to bring the pivots 132, 135 to the right of the pivot 124 so that when the treadle is released the pull of the link 134 will turn the arm 130 clockwise until the face 180 on the arm 130 engages the pin 182 and further movement of the lever arm 136, due to the action of the spring 158, will swing the burners to the right until the parts assume the initial position shown in Fig. 1.

In order to economize the consumption of gas when the burners are in either of their limiting positions, means is provided for turning down the gas flames of the burners when they reach either of the two limiting positions and for turning up the flames when the burners move away from either of those positions. A gas cock 194 is provided in the tube 110 which has an L-shaped bar fixed to the handle thereof, the bar comprising arms 196, 198, the arm 196 extending horizontally and the arm 198 extending upwardly and at an inclination toward the right as shown in Fig. 6. A spring 200 connected between the extremity of the arm 196 and the tube 112 acts, when unopposed, to hold the cock 194 in fully open position and the spring is allowed to hold the cock in this position while the burners are traveling under the grid. As the burners approach either of their limiting positions beyond the grid, the upper end of the arm 198 engages one or the other of two adjustable stop screws 202, 204 threaded through inturned ends of a bracket 206 secured to the upright 94 (Fig. 1). When the burners are swung toward the inoperative position shown in Fig. 1, the arm 198 engages the stop screw 202 and turns the cock against the tension of the spring 200 to turn down the gas flames of the burners 116. When the burners are swung away from the position shown in Fig. 1, the spring 200 acts to fully open the gas cock 194, in which position it remains until the burners 116 are approaching their opposite limiting position, whereupon the arm 198 engages the stop screw 204 and again partially closes the cock 194 against the tension of the spring 200. The burners therefore burn only with a small flame when standing idle at either limit of their travel and are automatically turned up during their traverse under the grids 102 by the action of the spring 200. The extent to which the tube 194 is turned to reduce the flames may be varied by adjusting the stop screws 202, 204.

In using the apparatus for activating thermoplastic cement upon an article, the article, for example a sole S, is placed upon the grid, preferably with its longitudinal axis extending in the direction of the burners 116 and with its cemented face in contact with the grid wires 104. The treadle 150 is then depressed and the mechanism operates as described to swing the burners from either limiting position in which they happen to be to the other limiting position at a slow rate determined by the dash-pot 168, the burners during the traverse under the sole serving to activate the cement thereon without substantially heating the body of the sole. The activated sole would be immediately located upon the shoe bottom and the shoe placed in a sole press having at least two heads, such as that disclosed in United States Letters Patent No. 1,549,243, granted August 11, 1925, upon application of E. E. Winkley, which may be provided with the improved pad and pad box disclosed in United States Letters Patent No. 2,018,808, granted October 24, 1935, upon application of Fred Ricks. Since the body of the sole is not substantially heated, the activated cement quickly cools sufficiently to overcome the reactive tendency of the sole to separate from the shoe and hence, by the time the cement on another sole has been activated, the sole applied to a shoe and placed under pressure in the other side of the machine, the cement on the first shoe has sufficiently set so that it can safely be removed.

Having thus described our invention, what we claim as new and desire to secure by Letters Patent of the United States is:

1. In apparatus for heat-activating cement, a grid to support an article to which thermoplastic cement has been applied, a heating device arranged to move to and fro past the grid, means for causing said heating device to move past the grid in each direction, and a single dash-pot arranged to control the rate of movement of the heating device first in one direction and then in the other.

2. In apparatus for heat-activating cement, a grid to support an article to which thermoplastic cement has been applied, a heating device arranged to move to and fro past the grid, a spring for causing said heating device to move past the grid in each direction, a single dash-pot arranged to cause movement of the heating device to occur at a predetermined rate in either direction, and means for varying said predetermined rate.

3. In apparatus for heat-activating cement, a grid for supporting a cemented article with the cemented face toward the grid, a heating device movable to and fro beneath the grid, a spring for causing the heating device to move beneath the grid, and a dash-pot for controlling the movement of said heating device in response to said spring.

4. In apparatus for heat-activating cement, a grid to support the face of an article to which thermoplastic cement has been applied, a heating device arranged at one side of the grid, a spring for relatively moving the heating device and the grid, and a dash-pot opposing the spring to cause the relative movement to take place at a predetermined rate and to cause the thermoplastic cement to be activated without substantially heating the body of the article.

5. In apparatus for heat-activating thermoplastic cement, a grid for supporting a cemented article with the cemented face toward the grid, a heating device movable to and fro beneath the grid, a spring for causing the heating device to move beneath the grid, a dash-pot for controlling the movement of said heating device in response to said spring, means for varying the mechanical advantage of the spring over the dash-pot, and a treadle for tensioning the spring and setting the dash-pot.

6. In apparatus for heat-activating cement, a horizontal grid to support cemented side down an article to which thermoplastic cement has been applied, a heating device arranged at one side of the grid, spring means for moving the heating device laterally beneath the grid, and a dash-pot arranged to cause the heating device to move at a predetermined rate to cause the thermoplastic cement exposed through the grid to be activated without substantially heating the body of the article.

7. In apparatus for heat-activating thermoplastic cement, a grid for supporting a cemented article with the cemented face toward the grid, a heating device movable to and fro beneath the grid, a spring for causing the heating device to move beneath the grid, a dash-pot for controlling the movement of said heating device in response to said spring, and a treadle for tensioning the spring.

8. In apparatus for heat-activating thermoplastic cement, a grid adapted to support a cemented sole in a horizontal position, a linear heating element extending lengthwise of the sole and arranged to travel past the cemented face of the sole, a spring for causing said heating element to travel from side to side of the sole, and a dash-pot arranged to cause said travel to take place at a predetermined slow rate progressively to activate the cement from one lateral extremity of the sole to the other.

9. In apparatus for activating thermoplastic cement, an arcuate grid for supporting the cemented face of an article, a heating device movable to and fro beneath the grid about the center of curvature of the grid, a spring for causing the heating device to swing upon its pivot, means for tensioning the spring, and means for causing the spring to swing the heating device first in one direction and then in the other.

10. In apparatus for heat-activating thermoplastic cement, a horizontal grid for supporting a cemented sole with its cemented face in contact with the grid, a heating element arranged to travel beneath the cemented face of the sole in proximity to the cement, means comprising a spring and a dash-pot for causing said heating element to travel beneath the sole at a predetermined slow rate progressively to activate the cement from one extremity of the sole to the other, and means for causing said spring and dash-pot to move the heating element beneath the sole in the opposite direction to activate the same or another sole.

11. In apparatus for activating thermoplastic cement, an arcuate grid for supporting the cemented face of an article, a heating device movable to and fro beneath the grid about the center of curvature of the grid, a spring for causing the heating device to swing upon its pivot, a dash-pot to control movement of the heating device in response to the pull of the spring, means for tensioning the spring, and means for causing the spring and dash-pot to swing the heating device and control its rate of movement first in one direction and then in the other.

12. In apparatus for heat-activating thermoplastic cement, a grid, a support mounted to swing to and fro beneath the grid, a heating device carried by the support, a lever, a treadle for operating the lever, a spring connected to the lever so as to be tensioned when the treadle is operated, a dash-pot connected to the lever to oppose the action of the spring and cause the lever to be operated slowly by the spring when the treadle is released, and connections from said lever to the support to cause the support to be swung in one direction upon release of the treadle and upon depression and release of the treadle a second time to cause the support to be swung in the opposite direction.

13. In apparatus for heat-activating thermoplastic cement, a grid, a support mounted to swing to and fro beneath the grid, a heating device carried by the support, a lever, a treadle for operating the lever, a spring connected to the lever so as to be tensioned when the treadle is operated, a dash-pot connected to the lever to oppose the action of the spring and cause the lever to be operated slowly by the spring when the treadle is released, and connections from said lever to the support to cause the support to be swung first in one direction and then in the other upon successive operations and releases of the treadle.

14. In apparatus for heat-activating thermoplastic cement, an arcuate grid for supporting a sole with its cemented face in contact with the grid, a support pivoted below the grid to swing about the center of curvature of the grid, heating means carried by the support, stops for limiting the movement of the support so that in the limiting positions the heating means will be beyond the grid, a treadle-operated lever, a spring connected to the lever so as to be tensioned when the treadle is depressed and to tend to return the lever to initial position when the treadle is released, a dash-pot connected to the lever so as to be set by depression of the treadle and to control movement of the lever in response to the spring when the treadle is released, an arm pivoted for movement bodily with the support and to swing with respect to the support between two limiting positions, the end of the arm being in one limiting position on one side of the pivot of the support and in the other limiting position on the other side of the pivot of the support, a link connecting the end of said arm to the treadle-actuated lever, and means acting when the treadle is released to cause the arm to be thrown from one to the other of its limiting positions.

15. In apparatus for heat-activating cement, a grid adapted to support the cemented area of a sole, the grid being in two parts supported on separate pivots whereby the two parts may be positioned in the same plane to support a flat sole and the parts may be inclined to each other to support a molded or conformed sole, and a heating device arranged to pass to and fro beneath the grid to activate the cement on the sole.

16. In apparatus for heat-activating cement, a grid adapted to support the cemented area of a sole, the grid being in two parts supported on separate pivots whereby the two parts may be positioned in the same plane to support a flat sole and the parts may be inclined to each other to support a molded or conformed sole, and a pair of tubular gas burners arranged beneath the grid, said burners overlapping at their inner ends and being pivoted at their outer ends to permit them to be arranged parallel to the grid in its various adjusted positions.

17. In apparatus for heat-activating cement, a grid adapted to support the cemented area of a sole, the grid being in two parts, one side of each being adjacent to one side of the other and each at the opposite side being pivoted to a fixed support whereby the two parts may be positioned in the same plane to support a flat sole and the parts may be inclined to each other to support a molded or conformed sole, and a heating device arranged to pass to and fro beneath the grid to activate the cement on the sole.

18. In apparatus for heat-activating cement, a grid adapted to support the cemented area of a sole, the grid being in two parts supported on separate pivots whereby the two parts may be positioned in the same plane to support a flat sole and the parts may be inclined to each other to support a molded or conformed sole, and a pair of tubular linear gas burners arranged beneath the grid and pivoted at their ends to permit them to be arranged parallel to the grid in its various adjusted positions.

19. In apparatus for heat-activating thermoplastic cement, a support to receive the cemented face of an article, a heating device arranged to move from an inoperative position at one side of the support to an inoperative position on the opposite side of the support, means for reducing the energy expended by the heating device when the device is in either of its inoperative positions, and means for increasing the energy consumption of the device while it is moving from one inoperative position to the other.

20. In apparatus for heat-activating thermoplastic cement, a support to receive the cemented face of an article, a gas burner located beneath the support and arranged to move beneath the support from an inoperative position at one side of the support to an inoperative position on the other side of the support, and means for reducing the gas supplied to the burner when in either of its inoperative positions and for increasing said supply while the burner is in transit from one inoperative position to the other.

JOHN WILLIAM PRATT.
HUBERT BOOTHROYD.